Figure 1:
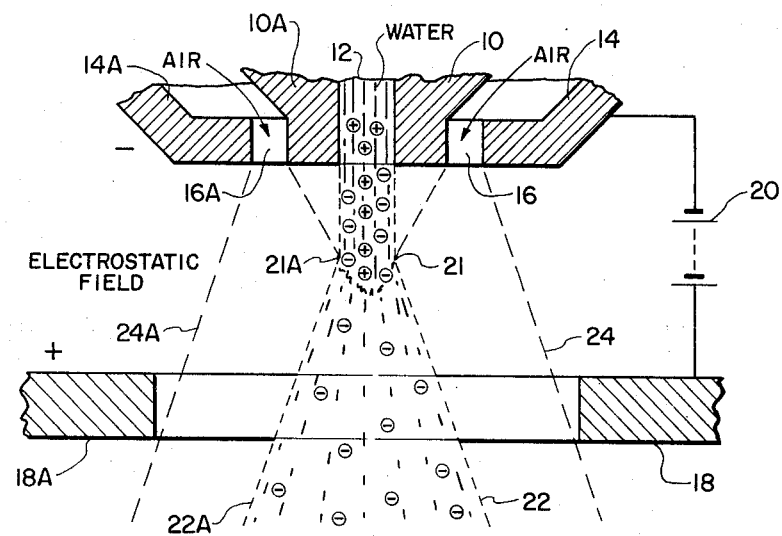
Figure 2:
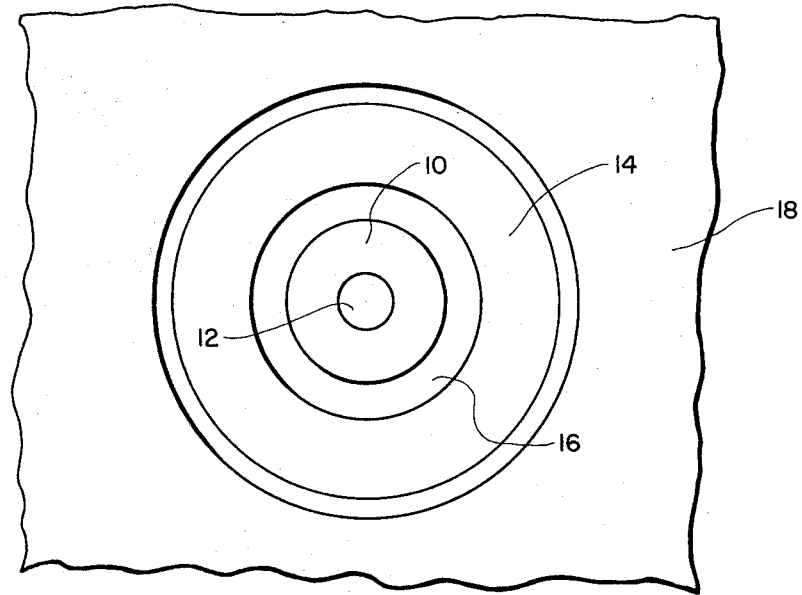

United States Patent [19]
Buser et al.

[11] 3,802,625
[45] Apr. 9, 1974

[54] DEVICE FOR ELECTROSTATIC CHARGING OR DISCHARGING

[75] Inventors: Rudolf G. Buser, Wall; Helmuth M. Kaunzinger, Neptune, both of N.J.

[73] Assignee: The United States of America as represented by the Secretary of the Army, Washington, D.C.

[22] Filed: Jan. 8, 1973

[21] Appl. No.: 322,044

[52] U.S. Cl. .................................. 239/15, 317/2 E
[51] Int. Cl. ............................................. B05b 5/02
[58] Field of Search .......... 317/2 E, 2 R, 3; 239/15, 239/3

[56] References Cited
UNITED STATES PATENTS

| | | | |
|---|---|---|---|
| 3,635,401 | 1/1972 | Bromley et al. | 239/15 |
| 3,269,446 | 8/1966 | Luther | 239/15 X |
| 2,523,618 | 9/1950 | Gilman | 317/3 X |
| 3,600,632 | 8/1971 | Bright et al. | 317/2 E |

*Primary Examiner*—M. Henson Wood, Jr.
*Assistant Examiner*—John J. Love
*Attorney, Agent, or Firm*—Edward J. Kelly; Herbert Berl

[57] ABSTRACT

This disclosure relates to electrostatic charges and particularly to a device that can either charge or discharge the electrostatic potential of a body with respect to its environment. More particularly, this invention relates to the use of a conductive liquid expelled from a nozzle positioned in a strong electrostatic field, wherein the liquid is converted to fine, charged droplets to form an ionic current away from the nozzle. The nozzle and any associated equipment is charged or discharged accordingly. If the polarity of the electrostatic field in which the droplets are formed is reversed, the opposite polarity of charge or discharge will occur.

2 Claims, 2 Drawing Figures

DEVICE FOR ELECTROSTATIC CHARGING OR DISCHARGING

BACKGROUND OF THE INVENTION

The accumulation of charges on metallic and dielectric bodies due to surface contact effects — triboelectric charging — is a well known phenomenon. Hazardous electrostatic charges effect operations, for example, in paper and textile industries, printing plants, mines, mills and oil tankers.

The problems of electrostatic, or triboelectric and atmospheric charging of an aircraft during flight are also well known. The charge may be built up by the friction of the air along the body of the aircraft, or the blades of a propellor-driven aircraft, or the rotors of a helicopter during flight. This process, together with inductive charging due to the large scale atmospheric electrical fields, and the chemical charging due to the specific chemistry of the combustion process, causes a problem of long standing.

As in the case of electrostatic charges, the low capacitance of the aircraft with respect to ground and the very effective insulation of the air between the aircraft and ground make extremely high potential gradients possible and result in electrostatic charges of extremely high voltage that involve hazards to personnel and possible ignition of fuel-air mixtures or activation of explosives. For new, large-size, transport helicopters now in the planning stage, the probability of hazardous situations is considerably increased.

These electrostatic charges are discharged as the wheels of a descending aircraft touch the ground and, in the case of an aircraft coming into an open runway, present no serious hazard. However, in the case of helicopters, hovering very close to ground, and dropping down cables, during sling loading operation, to pick up cargoes — which may include gasoline or other explosives — there is a very real danger of fire or explosion as well as bodily injury when a cable drops close enough to arc-over.

Electrostatic charges on the surface of conductive bodies, such as aircraft, can, obviously, be discharged by a weighted wire lowered from the hovering aircraft, to ground the aircraft before any other contact is made with grounded personnel or equipment. However, such a system would have mechanical problems such as the control of the unwinding or winding of the wire; the breakage or failure of the wire; and the potential arcing or physical damage from the weight hanging from the wire.

Electrostatic charges accumulated on the surface of conductive bodies may also be discharged in a passive mode by charge-carrying droplets or particles emitted from nozzles electrically connected to the charged body. The time constant of this decay is inversely proportional to the number of droplets of uniform surface emitted by a nozzle per time unit. This passive mode of discharge follows, approximately, a decaying exponential function; therefore, a complete discharge takes a theoretically-infinite time, and since the physical droplet current remains constant while the electrical discharging current drops toward zero, the efficiency also approaches zero for the greater portion of the discharge cycle.

Aside from this inescapable inefficiency these systems are limited inherently to discharging functions, and are impractical for other functions such as charging a given body.

The subject disclosure covers an active method of droplet discharge which yields a nearly-constant, reversible, charge or discharge of current that is essentially independent of the momentary potential of the discharging body.

SUMMARY OF THE INVENTION

This disclosure teaches a device that includes one or more nozzles with corresponding auxilliary electrodes, biased with respect to the nozzles, that can charge or discharge a given body in either polarity. A slightly conductive liquid forced through an orifice in each nozzle is broken up by a blast of air into a fine mist of charged droplets that are driven away by the same blast to change the electrostatic charge on the nozzle and any associated body. The charge stored on individual droplets is now governed by a constant electrostatic field between each nozzle and its associated auxiliary electrode. Such a device is particularly suitable for mounting on a helicopter, and can be autumatically controlled to bring the charge on the helicopter to that of the ground or other object it is approaching to avoid possibly-serious damages due to electrical shock.

BRIEF DESCRIPTION OF THE DRAWINGS

FIG. 1 is a cross section of a portion of a nozzle and a biasing electrode of a single element of this device; and FIG. 2 is a plan view of the same element.

DESCRIPTION OF THE PREFERRED EMBODIMENT

Referring now more particularly to FIG. 1, a portion of a nozzle assembly is shown in cross section with opposing sides 10 and 10A of a central portion surrounding a central orifice 12, and concentric outer portions 14 and 14A defining an annular orifice 16 and 16A. A concentric metallic electrode is also shown in cross section with opposing sides 18 and 18A spaced from the nozzle assembly. A source of potential 20 is connected between the nozzle assembly and the concentric electrode.

The rest of the nozzle assembly has been omitted, for simplicity, since it could have several types of configuration that would be obvious to one skilled in the art.

FIG. 2 shows a plan view of the same structure with the same elements similarly numbered. The central portion 10 surrounds the central orifice 12 and the outer portion 14 defines the annular orifice 16 all surrounded by the concentric electrode 18.

In operation, a slightly conductive liquid such as salty water is expressed from the central orifice 12 under relatively low pressure. A stream of air is expressed, under relatively high pressure, from the annular orifice 16. The air will disperse, generally along the dashed lines 24 and 24A, as shown, to pass through the concentric opening in the electrode 18, and to meet the stream of water at the points 21 and 21A, whereat the solid stream of liquid is broken up into droplets and dispersed outwardly in a cone-like pattern, generally along the dashed lines towards 22, 22A.

In this device, the electrode is charged to a substantial voltage by the source of potential 20. This produces an electrostatic field between the electrode and the nozzle assembly. As the slightly conductive liquid moves away from the nozzle into the electrostatic field, two effects take place. The liquid becomes polarized by induction due to the acting coulomb forces, and the liquid is separated into droplets by the stream of air. This principle is applied to a metallic nozzle structure.

The electrostatic forces of the field induce charges with a polarity opposite to that of the electrode to flow to the surface of the liquid. The fast streaming air leaving the nozzle under high pressure, from the annular orifice surrounding the central liquid orifice, interacts with the charged, surface layer of the liquid to form droplets that are also charged to the polarity opposite to that of the grid electrode. The charged droplets leave the nozzle assembly to pass through the opening in the concentric grid electrode, and provide mechanical transport of electrical charges away from the nozzle structure. This produces the effective nozzle discharge current.

The charge on the droplets being emitted and the number of droplets relative to the amount of water is fairly constant, which causes the effective current leaving from the nozzle assembly to be fairly constant. This current changes the potential on the nozzle assembly, and any other body or structure associated with it, in a predictable manner and at a rate proportional to the charged mist produced by the nozzle assembly.

While the flow of current away from the nozzle is basically intended to discharge the structure to zero potential, it will, if continued, recharge the structure in the opposite polarity. In other words, the nozzle assembly and associated structure may be charged as well as discharged by this device.

If it is necessary to discharge, or charge, the apparatus in the opposite polarity, the voltage on the electrode 18 can be reversed with respect to that of the nozzle assembly and the identical phenomenon takes place in the opposite polarity.

All of the parameters of this device can be varied over quite a wide range with, for the most part, predictable results. Fairly effective result were achieved with the diameter of the central orifice 12 at 0.02 inches; the inner diameter of the annular orifice 16 at 0.05 inches; and the outer diameter of the orifice 16 at 0.079 inches. The electrode 18 had an inner diameter of 0.5 inches and was spaced 0.4 inches away from the nozzle assembly.

The bias voltage between the electrode 18 and the nozzle assembly was 9 kilovolts. An air pressure of 7.7 kilograms per square centimeter produced a flow of air of 17 meters per second through the annular orifice 16. A water pressure of 28 kilograms per square centimeter produced a flow of water of 12 cubic centimeters per second through the central orifice 12. This produced a cone of spray between 22 and 22A of about 28° and a nozzle current of about 16 microamperes.

The nozzle current increases in a fairly linear manner as the bias voltage increases from 0 to about 8 or 9 kilovolts and then tends to decrease. Leakage current between the electrode and the nozzle assembly begins to be apparent at about 4 kilovolts and increases rapidly above 8 or 10 kilovolts, which accounts for the decrease in nozzle current.

For the particular electrode geometry shown in FIG. 1, the nozzle current increases slightly, as the electrode to nozzle spacing is increased and the nozzle current decreases slightly as the electrode aperture diameter is increased.

While the nozzle current is fairly constant, regardless of the charge on the body associated with the nozzle assembly, the air-turbulence-induced particle recirculation decreases as the aircraft potential increases. This is in contrast to the corona discharge approach where the circulation becomes a maximum at high potential. It is predicted that the particle recirculation will approach zero as the aircraft potential rises near the corona limit.

To achieve higher currents for the more rapid discharge of a given structure, additional nozzle assemblies and corresponding electrodes of identical size and shape may be used. This will, predictably, increase the current almost in direct proportion to the number of nozzles. The use of additional nozzles is simplified by the fact that they all may use the same supply of water and air under pressure and the same voltage on the electrodes. In fact, the electrodes may be made of one sheet of metal with suitable openings for any number of nozzle assemblies.

An important parameter in the operation of this system is the choice of the liquid itself, and, aside from the surface tension, conductivity is the only material quantity entering the analysis. If the conductivity were to be substantially reduced, the observed discharge current will be limited by high resistance, and an unwanted voltage drop between the liquid column and the nozzle structure develops. If the conductivity were to be increased to approach the extreme of perfect metallic conduction, penetration of the field lines into the inner part of the interaction layer becomes impossible and the effective interaction area is reduced. The optimum nozzle current appears to be with about 0.6 to 0.8 grams of table salt to 8 liters of distilled water.

Although water is the obvious choice of liquid for use in this device, it will be apparent that any other available liquid of suitable conductivity can be used. It is also obvious that other chemicals or materials, such as anti-freeze may be added to the water to change the surface tension, freezing point, or other characteristic of the water for special purposes. Such chemicals and anti-freeze compounds may also have a significant effect on the droplet size and the electrical characteristics of the device.

While compressed air is obviously readily available and usable for this device, other compressed gases such as nitrogen may also be used.

We wish it to be understood that we do not desire to be limited to the exact details of construction shown and described, for obvious modifications will occur to a person skilled in the art.

What is claimed is:

1. A device for reducing electrostatic charge of a helicopter comprising:

means for containing a supply of salt water wherein the ratio of salt to water is 0.6 to 0.8 grams of table salt per 8 liters of distilled water;

means for containing a supply of air under pressure;

a nozzle means having a circular central orifice for directing a stream of said salt water away from said helicopter;

said nozzle means having a second orifice in the form of an annular opening surrounding said circular central orifice adjacent to the first orifice for directing a stream of said air to intersect a stream of salt water issuing from said circular central orifice to form a stream of fine droplets directed away from said helicopter;

an electrode coaxial with said circular orifice and having a circular opening of larger diameter than said second orifice through which said stream of fine droplets are directed and accelerated away from said helicopter, positioned adjacent to and downstream of said nozzle means;

means for applying a potential to said electrode with respect to said nozzle means to create a strong electrostatic field, between said electrode and said nozzle means to charge said fine droplets to a polarity opposite to that of said electrode and accelerate that charge away from said helicopter, said potential applying means being able to apply a potential near that at which leakage current increases rapidly between the electrode and the nozzle means and nozzle current tends to decrease.

2. A device as defined in claim 1 wherein the diameter of said circular central orifice is 0.02 inches, the inner diameter of said second orifice is 0.05 inches, the outer diameter of said second orifice is 0.079 inches, the circular opening of said electrode is 0.5 inches, the distance between said electrode and said nozzle means is 0.4 inches, and said means for applying a potential applies 9 kilovolts.

* * * * *